(12) United States Patent
Stein

(10) Patent No.: US 12,501,209 B2
(45) Date of Patent: *Dec. 16, 2025

(54) SPATIAL AUDIO CAPTURE AND ANALYSIS WITH DEPTH

(71) Applicant: DTS, Inc., Calabasas, CA (US)

(72) Inventor: Edward Stein, Soquel, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,040

(22) Filed: Apr. 23, 2024

(65) Prior Publication Data

US 2024/0276142 A1 Aug. 15, 2024

Related U.S. Application Data

(63) Continuation of application No. 17/754,334, filed as application No. PCT/US2019/055693 on Oct. 10, 2019, now Pat. No. 11,997,456.

(51) Int. Cl.
*H04R 1/40* (2006.01)
*G10L 19/008* (2013.01)
(Continued)

(52) U.S. Cl.
CPC ............ *H04R 1/406* (2013.01); *G10L 19/008* (2013.01); *H04N 13/204* (2018.05);
(Continued)

(58) Field of Classification Search
CPC .... H04R 1/406; H04R 3/005; H04R 2201/40; H04R 2430/21; H04N 13/204; H04N 13/271; G10L 19/008
(Continued)

(56) References Cited

U.S. PATENT DOCUMENTS 9,332,373 B2   5/2016   Beaton et al.
9,363,569 B1   6/2016   van Hoff et al.
(Continued)

FOREIGN PATENT DOCUMENTS

EP       3358844 A1    8/2018
WO    2019012135 A1    1/2019
(Continued)

OTHER PUBLICATIONS

"International Application Serial No. PCT/US2019/055693, International Preliminary Report on Patentability mailed Feb. 10, 2022", 10 pgs.

(Continued)

*Primary Examiner* — Norman Yu
(74) *Attorney, Agent, or Firm* — Lerner David LLP

(57) ABSTRACT

Spatial audio signals can include audio objects that can be respectively encoded and rendered at each of multiple different depths. In an example, a method for encoding a spatial audio signal can include receiving audio scene information from an audio capture source in an environment, and receiving a depth characteristic of a first object in the environment. The depth characteristic can be determined using information from a depth sensor. A correlation can be identified between at least a portion of the audio scene information and the first object. The spatial audio signal can be encoded using the portion of the audio scene and the depth characteristic of the first object.

20 Claims, 9 Drawing Sheets

(51) Int. Cl.
*H04N 13/204* (2018.01)
*H04N 13/271* (2018.01)
*H04R 3/00* (2006.01)

(52) U.S. Cl.
CPC ........... *H04N 13/271* (2018.05); *H04R 3/005* (2013.01); *H04R 2201/40* (2013.01); *H04R 2430/21* (2013.01)

(58) Field of Classification Search
USPC ........ 381/303, 92, 22, 23, 310, 74; 382/154, 382/103
See application file for complete search history.

(56) References Cited

U.S. PATENT DOCUMENTS

| | | |
|---|---|---|
| 9,706,292 B2 | 7/2017 | Duraiswami et al. |
| 9,973,874 B2 | 5/2018 | Stein et al. |
| 2012/0288114 A1 | 11/2012 | Duraiswami et al. |
| 2015/0058102 A1 | 2/2015 | Christensen et al. |
| 2017/0223478 A1 | 8/2017 | Jot et al. |
| 2017/0236149 A1 | 8/2017 | Christensen et al. |
| 2017/0236162 A1 | 8/2017 | Christensen et al. |
| 2017/0272651 A1 | 9/2017 | Mathy et al. |
| 2017/0366912 A1 | 12/2017 | Stein et al. |
| 2017/0366913 A1 | 12/2017 | Stein et al. |
| 2017/0366914 A1 | 12/2017 | Stein et al. |
| 2018/0007490 A1 | 1/2018 | Lehtiniemi et al. |
| 2018/0332389 A1* | 11/2018 | Ekkizogloy ............. G10L 15/26 |
| 2019/0341054 A1 | 11/2019 | Krupka et al. |
| 2020/0241552 A1* | 7/2020 | Leenayongwut ...... H04R 3/005 |

FOREIGN PATENT DOCUMENTS

| | | | |
|---|---|---|---|
| WO | WO 2019/012135 | * | 1/2019 |
| WO | 2021071498 A1 | | 4/2021 |

OTHER PUBLICATIONS

"International Application Serial No. PCT/US2019/055693, International Search Report mailed Jun. 24, 2020", 5 pgs.
"International Application Serial No. PCT/US2019/055693, Written Opinion mailed Jun. 24, 2020", 9 pgs.

\* cited by examiner

SPATIAL AUDIO CAPTURE AND ANALYSIS WITH DEPTH

CROSS-REFERENCE TO RELATED APPLICATIONS

This application is a continuation of U.S. application Ser. No. 17/754,334, filed on Mar. 30, 2022, which is a continuation of United States Application No. PCT/US2019/055693, filed on Oct. 10, 2019, the disclosure of which is incorporated herein by reference.

BACKGROUND

Audio and video capture systems, such as can include or use microphones and cameras, respectively, can be co-located in an environment and configured to capture audio-visual information from the environment. The captured audio-visual information can be recorded, transmitted, and played back on demand. In an example, the audio-visual information can be captured in an immersive format, such as using a spatial audio format and a multiple-dimension video or image format.

In an example, an audio capture system can include a microphone, a microphone array, or other sensor comprising one or more transducers to receive audio information from the environment. An audio capture system can include or use a spatial audio microphone, such as an ambisonic microphone, configured to capture a three-dimensional or 360-degree soundfield.

In an example, a video capture system can include a single lens camera or a multiple lens camera system. In an example, a video capture system can be configured to receive 360-degree video information, sometimes referred to as immersive video or spherical video. In 360-degree video, image information from multiple directions can be received and recorded concurrently. In an example, a video capture system can include or comprise a depth sensor configured to detect depth information for one or more objects in a field of view of the system.

Various audio recording formats are available for encoding three-dimensional audio cues in a recording. Three-dimensional audio formats include ambisonics and discrete multi-channel audio formats comprising elevated loudspeaker channels. In an example, a downmix can be included in soundtrack components of multi-channel digital audio signals. The downmix can be backward-compatible, and can be decoded by legacy decoders and reproduced on existing or traditional playback equipment. The downmix can include a data stream extension with one or more audio channels that can be ignored by legacy decoders but can be used by non-legacy decoders. For example, a non-legacy decoder can recover the additional audio channels, subtract their contribution in the backward-compatible downmix, and then render them in a target spatial audio format.

In an example, a target spatial audio format for which a soundtrack is intended can be specified at an encoding or production stage. This approach allows for encoding of a multi-channel audio soundtrack in the form of a data stream compatible with legacy surround sound decoders and one or more alternative target spatial audio formats also selected during an encoding or production stage. These alternative target formats can include formats suitable for the improved reproduction of three-dimensional audio cues. However, one limitation of this scheme is that encoding the same soundtrack for another target spatial audio format can require returning to the production facility to record and encode a new version of the soundtrack that is mixed for the new format.

Object-based audio scene coding offers a general solution for soundtrack encoding independent from a target spatial audio format. An example of an object-based audio scene coding system is the MPEG-4 Advanced Audio Binary Format for Scenes (AABIFS). In this approach, each of the source signals is transmitted individually, along with a render cue data stream. This data stream carries time-varying values of the parameters of a spatial audio scene rendering system. This set of parameters can be provided in the form of a format-independent audio scene description, such that the soundtrack may be rendered in any target spatial audio format by designing the rendering system according to this format. Each source signal, in combination with its associated render cues, can define an "audio object." This approach enables a renderer to implement accurate spatial audio synthesis techniques to render each audio object in any target spatial audio format selected at the reproduction end. Object-based audio scene coding systems also allow for interactive modifications of the rendered audio scene at the decoding stage, including remixing, music re-interpretation (e.g., karaoke), or virtual navigation in the scene (e.g., video gaming).

BRIEF SUMMARY

The present inventors have recognized that a problem to be solved includes capturing soundfield information into a depth-quantized spatial audio format. For example, the present inventors have recognized that a spatial audio signal can include farfield or omnidirectional components, nearfield components, and information from intermediate fields such by interpolating or mixing signals from different depths. For example, auditory events that are to be simulated in a spatial region between a designated nearfield and farfield can be created by crossfading between the two depths.

The problem can include, for example, audio scene information captured using a soundfield microphone but without depth information. Such captured audio scene information is generally quantized to a general or non-specific "soundfield" and then rendered or encoded as farfield information. A decoder receiving such information may not be configured to differentiate between nearfield and farfield sources, and may not take advantage of or use nearfield rendering. Some information captured using, for example, a soundfield microphone can include nearfield information. However, if depth information is not encoded along with the audio scene information, then the nearfield information can be relegated to a farfield, or other reference soundfield, or default depth.

A solution to the soundfield capture or audio capture problems can include using a depth sensor together with an audio sensor to receive, substantially concurrently, acoustic information and visual information about an environment. A depth sensor can include a three-dimensional depth camera, or a two-dimensional image sensor or plurality of sensors with processing capabilities, among other things. The depth sensor can render or provide information about one or more objects in an environment. An audio sensor can include one or more microphone elements that can sense acoustic information from an environment. In an example, the solution includes a system or encoder configured to combine information from the depth sensor and audio sensor to provide a spatial audio signal. The spatial audio signal can include one or more audio objects and the audio objects can have respective depth characteristics.

This Summary is intended to provide an overview of the subject matter of the present patent application. It is not intended to provide an exclusive or exhaustive explanation of the invention. The detailed description is included to provide further information about the present patent application.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1B:
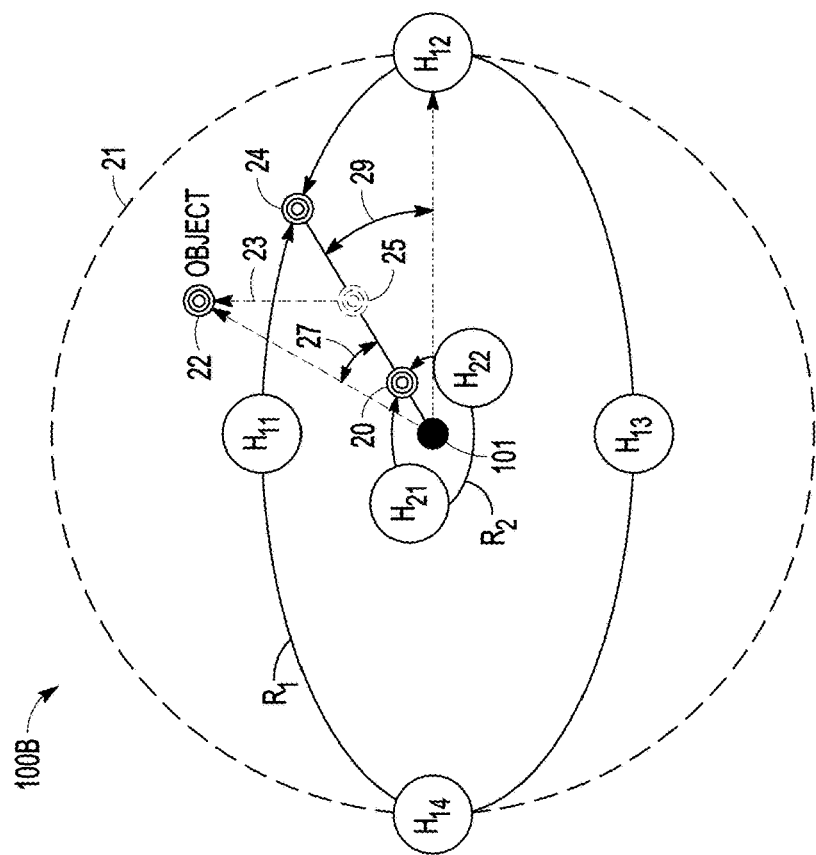
FIGS. 1A-1C illustrate generally schematic diagrams of an audio source or object location relative to a listener.

In the following description that includes examples of systems, methods, apparatuses, and devices for performing spatial audio signal processing, such as for coordinating audio-visual program information, reference is made to the accompanying drawings, which form a part of the detailed description. The drawings show, by way of illustration, specific embodiments in which the inventions disclosed herein can be practiced. These embodiments are generally referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

The present subject matter concerns processing audio signals (i.e., signals representing physical sound). These audio signals are typically represented by digital electronic signals. As used herein, the phrase "audio signal" can include a signal that represents a physical sound. Audio processing systems and methods described herein can include hardware circuitry and/or software configured to use or process audio signals using various filters. In some examples, the systems and methods can use signals from, or signals corresponding to, multiple audio channels. In an example, an audio signal can include a digital signal that includes information corresponding to multiple audio channels. Some example of the present subject matter can operate in the context of a time series of digital bytes or words, where these bytes or words form a discrete approximation of an analog signal or ultimately a physical sound. The discrete, digital signal corresponds to a digital representation of a periodically sampled audio waveform.

The present systems and methods can include an environment capture system. The environment capture system can include optical, visual, or auditory sensors, such as including one or more cameras, depth sensors, microphones, or other sensors configured to monitor an environment. The systems and methods can be configured to receive audio information from the environment and receive distance or location information about physical objects in the environment. The systems and methods can be configured to identify correlations between the audio information, or components thereof, and the physical objects in the environment. When correlations are identified between audio objects and physical objects, then a spatial audio signal can be encoded that includes an audio source for the audio object, such as with the audio source positioned at a virtual distance or location relative to a reference position and corresponding to one or more of the physical objects.

In an example, audio information or an audio signal received from a microphone can include information from a soundfield. The received audio information can be encoded substantially in real-time with depth information. For example, information from a depth sensor, such as a three-dimensional depth camera, can be used together with the audio information and the audio information can be encoded in a spatial audio format with a depth characteristic, such as including direction or depth magnitude information.

In an example, a system to perform spatial audio capture with depth can include a microphone array or soundfield microphone configured to capture a soundfield or sound scene. The system can include a depth camera or depth sensor configured to determine or estimate a depth of one or more objects in a field of view of the sensor, and can optionally be configured to receive depth information from multiple directions (e.g., up/down, left/right, etc.). In an example, the system can augment captured acoustic information with depth or distance information received from a depth sensor, and then encode the acoustic information and depth information in a spatial audio signal. The spatial audio signal can include components or sources with respective depths or distances relative to an origin or reference location.

In an example, information from a depth sensor includes information about a direction from a reference position or from a reference direction to one or more physical objects or potential audio sources. The direction information about physical objects can be correlated with audio objects. In an example, the encoded spatial audio information described herein can use head related transfer functions (HRTFs), such as can be synthesized or measured at various distances from a reference head, spanning from a nearfield to a farfield. Additional synthetic or measured transfer functions can be used to extend to the interior of the head, such as for distances closer than the nearfield. In addition, relative distance-related gains of each set of HRTFs can be normalized to farfield HRTF gains.

Figure 1A:
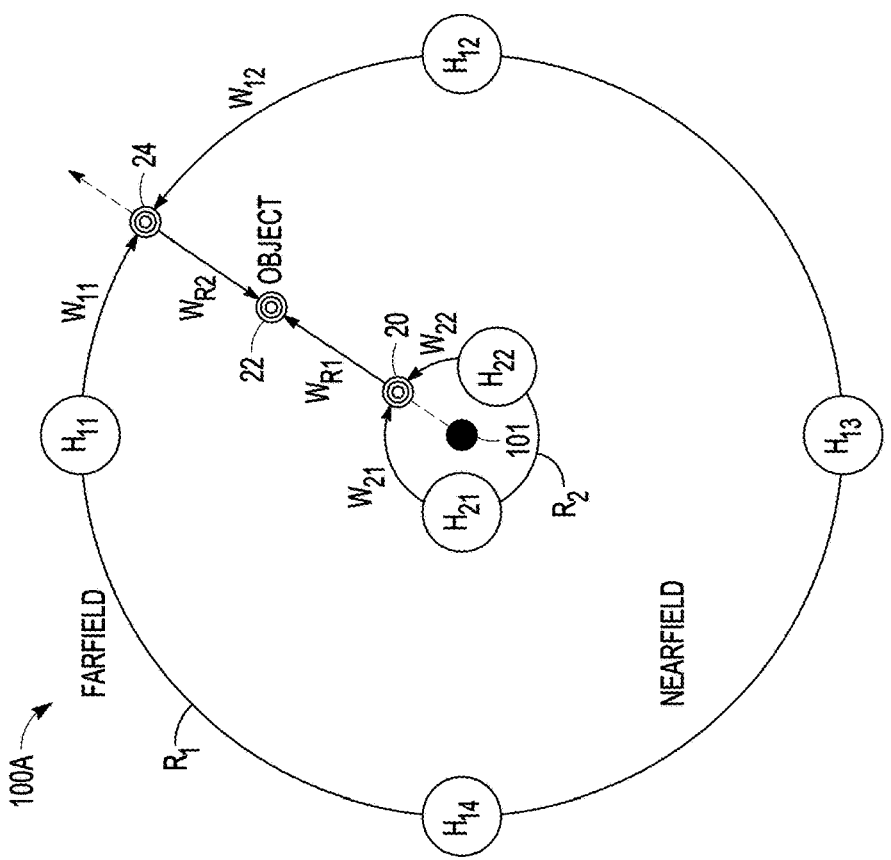
Figure 1C:
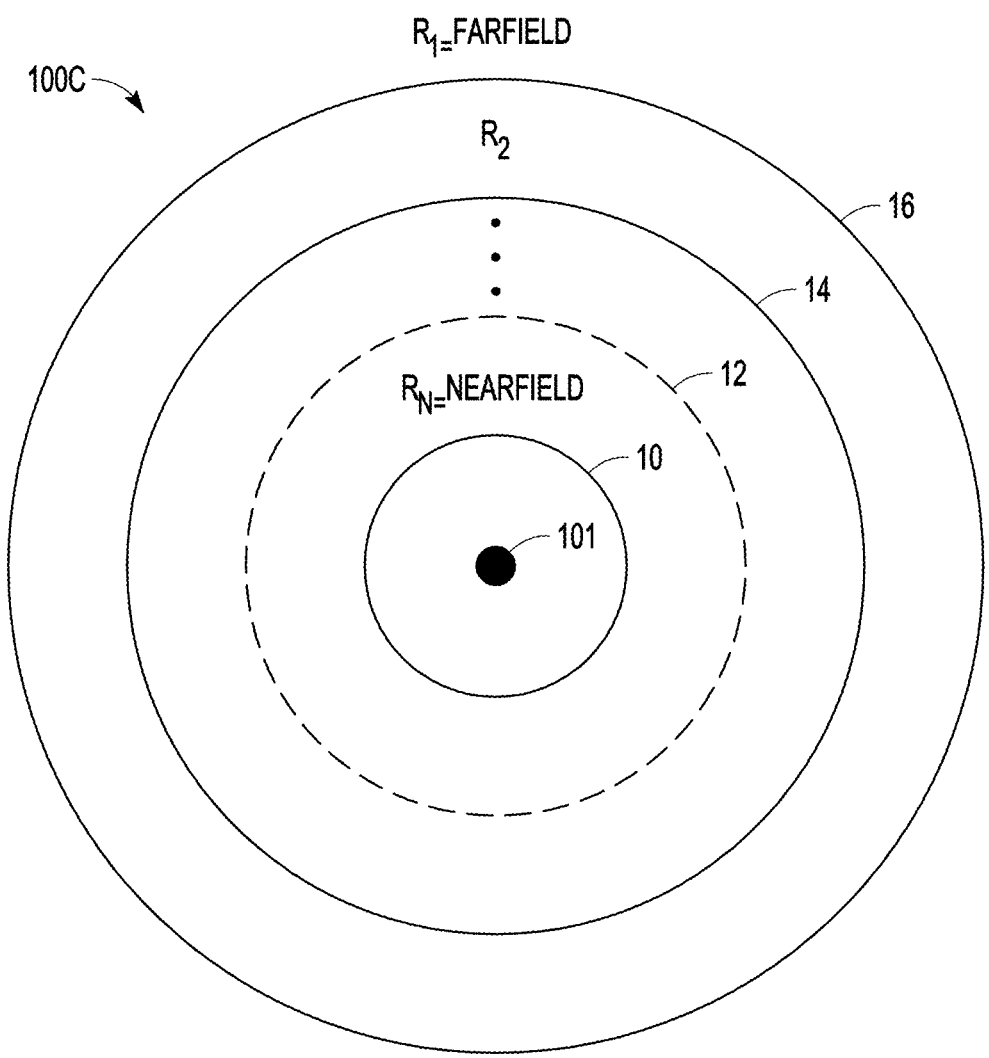

FIGS. 1A-1C illustrate generally schematic diagrams of a nearfield and a farfield for an example audio source or object location. FIG. 1A includes a first diagram 100A that shows a location of an audio object 22 relative to a reference position 101. The reference position 101 can be a location of a listener, a position of a microphone, a position of a camera or depth sensor, or other location used as a reference point in the environment represented by the first diagram 100A. In the examples of FIGS. 1A and 1B, the radius R1 can represent a distance from the reference position 101 that coincides with a farfield, and the radius R2 can represent a distance from the reference position 101 that coincides with a nearfield or a boundary thereof. The environment can be represented using more than two radii, for example, as shown in FIG. 1C, discussed below.

FIG. 1B includes a second diagram 100B that shows a spherical extension of the first diagram 100A of FIG. 1A, for example using a spherical representation 21. In FIG. 1B, the audio object 22 can have an associated height characteristic 23, and associated projection characteristic 25, such as onto a ground plane, an associated elevation characteristic 27, and an associated azimuth characteristic 29. In the examples of FIGS. 1A and 1B, any appropriate number of HRTFs can be sampled on a full 3D sphere of radius Rn, and the sampling in each common-radius HRTF set need not be the same. FIG. 1C includes a third diagram 100C that shows a soundfield divided or quantized into an arbitrary number of depths. For example, the object 22 can be located in a farfield position, a nearfield position, somewhere in between, or interior to the nearfield or beyond the farfield.

In the examples of FIGS. 1A-1C, various HRTFs (Hxy) are shown at positions at radii R1 and R2 that are centered on the reference position 101, where x represents a ring number or radius, and y represents a position on the ring. Such positionally-related HRTFs can be referred to as a "common-radius HRTF Set." In the examples, four location weights are shown in the farfield set and two in the nearfield set using the convention Wxy, where x represents a ring number and y represents a position on the ring. Indicators WR1 and WR2 represent radial weights that can be used to decompose the object 22 into a weighted combination of the common-radius HRTF sets. For example, the object 22 can comprise a combination of first and second sources 20 and 24 that, when rendered together, provide the object 22 at a desired depth or location.

In the examples of FIGS. 1A and 1B, as audio objects pass through the reference position 101, such as coinciding with a listener position, a radial distance to a center of a listener's head can be measured. Two measured HRTF data sets that bound this radial distance can be identified. For each set, an appropriate HRTF pair (e.g., ipsilateral and contralateral) can be derived based on a desired azimuth and elevation of the sound source or object location. A final combined HRTF pair can be determined by interpolating frequency responses of each new HRTF pair. This interpolation can be based on relative distances of the sound source to be rendered and an actual measured distance of each HRTF set. The sound source to be rendered can then be filtered by the derived HRTF pair and a gain of the resulting signal can be increased or decreased based on the distance to the listener's head. This gain can be limited to avoid saturation as the sound source approaches one of the listener's ears.

Each HRTF set can span a set of measurements or synthetic HRTFs made in the horizontal plane only or can represent a full sphere of HRTF measurements around the listener. Additionally, each HRTF set can have fewer or greater numbers of samples based on the measured radial distance.

Various techniques can be used to generate audio signals with distance or depth information. For example, U.S. Pat. No. 9,973,874, titled "Audio rendering using 6-DOF tracking," which is incorporated herein by reference in its entirety, includes examples of generating binaural audio with distance cues at FIGS. 2A-2C therein, and includes examples of determining HRTFs and interpolation between HRTF pairs at FIGS. 3A-3C therein.

In an example, rendering an audio object in both the nearfield and farfield can enable rendering depths of not just objects, but of any spatial audio mix decoded with active steering/panning, such as using ambisonics, matrix encoding, etc., and thereby enable full translational head tracking (e.g., user movement) with 6-degrees-of-freedom (6-DOF) tracking and rendering. Various systems and methods for attaching depth information to, for example, Ambisonic mixes created by capture or by Ambisonic panning, are discussed in U.S. Pat. No. 9,973,874, titled "Audio rendering using 6-DOF tracking", which is incorporated herein by reference in its entirety, and some aspects of which are summarized here. The techniques generally use first order Ambisonics as an example, but can be applied to third order or other higher order ambisonics.

Ambisonic Basics

Where a multichannel mix would capture sound as a contribution from multiple incoming signals, Ambisonics provides for capturing or encoding a fixed set of signals that represent the direction of all sounds in the soundfield from a single point. In other words, the same ambisonic signal could be used to re-render the soundfield on any number of loudspeakers. In a multichannel case, one can be limited to reproducing sources that originated from combinations of the channels. For example, if there are no height channels, then no height information is transmitted. In Ambisonics, on the other hand, information about a full directional picture can be captured and transmitted, and limitations are generally only imposed at the point of reproduction.

Figure 8:
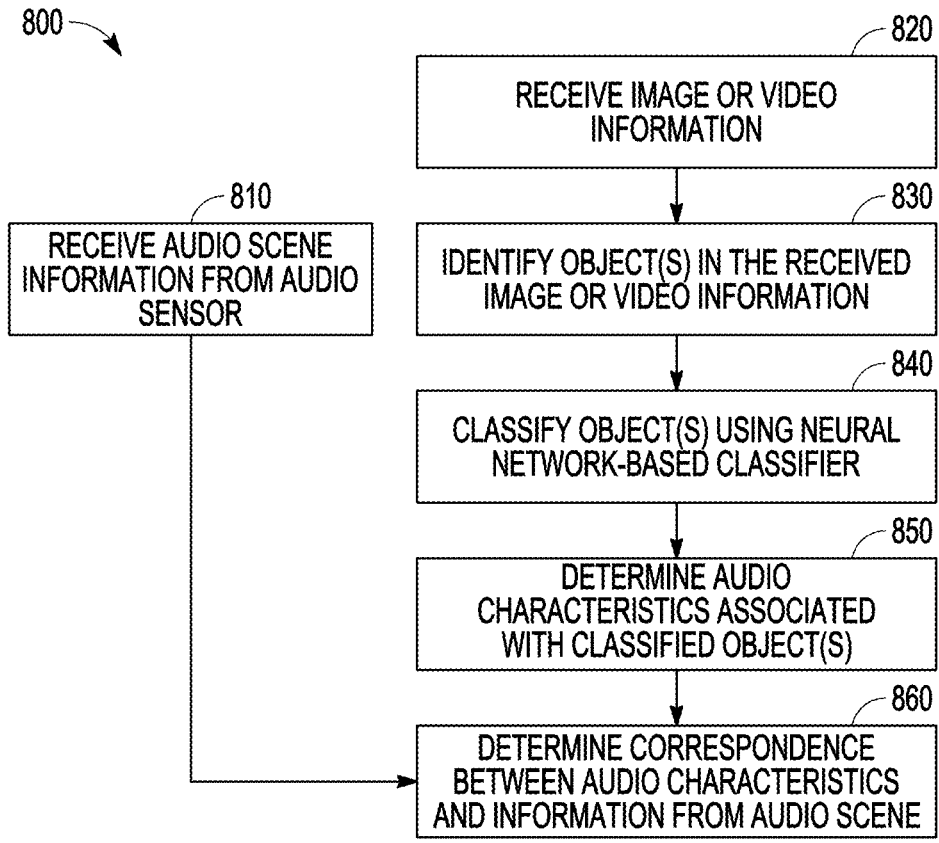
FIG. 8 illustrates generally an example of a fourth method that can include determining a correspondence between audio signal characteristics and information received about an audio scene.

Consider the set of 1st order (e.g., B-Format) panning equations, which can largely be considered virtual microphones at a point of interest:

$$W = S * 1/\sqrt{2}, \text{ where } W = \text{omni component};$$

$$X = S * \cos(\theta) * \cos(\phi), \text{ where } X = \text{figure 8 pointed forward};$$

$$Y = S * \sin(\theta) * \cos(\phi), \text{ where } Y = \text{figure 8 pointed right};$$

$$Z = S * \sin(\phi), \text{ where } Z = \text{figure 8 pointed up};$$

and $S$ is a signal to be panned.

From these four signals (W, X, Y, and Z), a virtual microphone pointed in any direction can be created. As such, a decoder receiving the signals can recreate a virtual microphone pointed to each of the speakers being used to render. This technique works to a large degree, but in some cases it is only as good as using real microphones to capture the response. As a result, while the decoded signal may have the desired signal for each output channel, each channel can also have a certain amount of leakage or "bleed" included, so there is some art to designing a decoder that best represents a decoder layout, especially if it has non-uniform spacing.

Headtracking can be supported by these kinds of solutions because the decoding is achieved by a combined weight of the WXYZ directional steering signals. To rotate a B-Format mix, for example, a rotation matrix may be applied with the WXYZ signals prior to decoding and the results will decode to the properly adjusted directions. However, such a solution may not be capable of implementing a translation (e.g., user movement or change in listener position).

Active Decode Extension

It can be desirable to combat leakage and improve the performance of non-uniform layouts. Active decoding solutions such as Harpex or DirAC do not form virtual microphones for decoding. Instead, they inspect the direction of the soundfield, recreate a signal, and specifically render it in the direction they have identified for each time-frequency. While this greatly improves the directivity of the decoding, it limits the directionality because each time-frequency tile uses a hard decision. In the case of DirAC, it makes a single direction assumption per time-frequency. In the case of Harpex, two directional wavefronts can be detected. In either system, the decoder may offer a control over how soft or how hard the directionality decisions should be. Such a control is referred to herein as a parameter of "Focus," which can be a useful metadata parameter to allow soft focus, inner panning, or other methods of softening the assertion of directionality.

Even in the active decoder cases, distance or depth can be a missing function. While direction is directly encoded in the ambisonic panning equations, no information about the source distance can be directly encoded beyond simple changes to level or reverberation ratio based on source distance. In Ambisonic capture and decode scenarios, there can be spectral compensation for microphone "closeness" or "microphone proximity," but this may not allow actively decoding one source at 2 meters, for example, and another at 4 meters, because the signals are limited to carrying only directional information. In fact, passive decoder performance relies on the fact that the leakage will be less of an issue if a listener is perfectly situated in the sweet spot and all channels are equidistant. These conditions maximize the recreation of the intended soundfield.

Depth Encoding

In an example, depth or distance information about an audio object can be encoded together with other information about an audio source. In an example, a transmission format or panning equations can be modified or enhanced to support adding depth indicators during content production. Unlike methods that apply depth cues such as loudness and reverberation changes in the mix, the methods discussed herein can include or enable measuring or recovering distance or depth information about a source in a mix so that it can be rendered for the final playback capabilities rather than those on the production side. Various methods with different trade-offs are discussed in U.S. Pat. No. 9,973,874, titled "Audio rendering using 6-DOF tracking", which is incorporated herein by reference in its entirety, including depth-based submixing and "D" channel encoding.

In depth-based submixing, metadata can be associated with each mix. In an example, each mix can be tagged with information about (1) distance of the mix, and (2) focus of the mix (e.g., an indication of how sharply the mix should be decoded, for example so that mixes inside the listener's head are not decoded with too much active steering). Other embodiments could use a Wet/Dry mix parameter to indicate which spatial model to use if there is a selection of HRIRs with more or less reflections (or a tunable reflection engine). Preferably, appropriate assumptions would be made about the layout so no additional metadata is needed to send it as an, e.g., 8-channel mix, thus making it compatible with existing streams and tools.

In "D" channel encoding, an active depth-enabled decoder can use information from a designated steering channel D. The depth channel can be used to encode time-frequency information about an effective depth of an ambisonic mix, which can be used by a decoder for distance rendering of sound sources at each frequency. The 'D' channel can encode as a normalized distance which can, in an example, be recovered as a value of 0 (being in the head at the origin), 0.25 being exactly in the nearfield, and up to 1 for a source rendered fully in the farfield. This encoding can be achieved by using an absolute value reference such as 0 dBFS or by relative magnitude and/or phase of one or more of the other channels, such as the "W" channel.

Another method of encoding a distance channel can include using directional analysis or spatial analysis. For example, if there is only one sound source detected at a particular frequency, then a distance or depth associated with the sound source can be encoded. If there is more than one sound source detected at a particular frequency, then a combination, such as a weighted average, of the distances associated with the sound sources can be encoded. Alternatively, the depth or distance channel can be encoded by performing frequency analysis of each individual sound source at a particular time frame. The distance at each frequency can be encoded for example as the distance associated with the most dominant sound source at that frequency or as the weighted average of the distances associated with the active sound sources at that frequency. The above-described techniques can be extended to additional D Channels, such as extending to a total of N channels. In the event that the decoder can support multiple sound source directions at each frequency, additional D channels could be included to support extending distance in these multiple directions.

Depth Rendering and Source Translation

The distance rendering techniques discussed herein can be used to achieve a sensation of depth or proximity in binaural renderings. Distance panning can be used to distribute a sound source over two or more reference distances. For example, a weighted balance of far and near field HRTFs can be rendered to achieve a target depth. The use of such a distance panner to create submixes at various depths can also be useful in the encoding or transmission of depth information. Generally, submixes can each include or represent information having the same directionality of the scene encoding, and a combination of multiple submixes reveals depth information through their relative energy distributions. Such energy distributions can include a direct quantization of depth, for example being evenly distributed or grouped for relevance such as "near" and "far." In an example, such energy distributions can include a relative steering or closeness or far-ness relative to a reference distance, e.g., some signal being understood to be nearer than the rest of the farfield mix.

Audio-Visual Scene Capture and Spatial Audio Signal Encoding

Figure 2A:
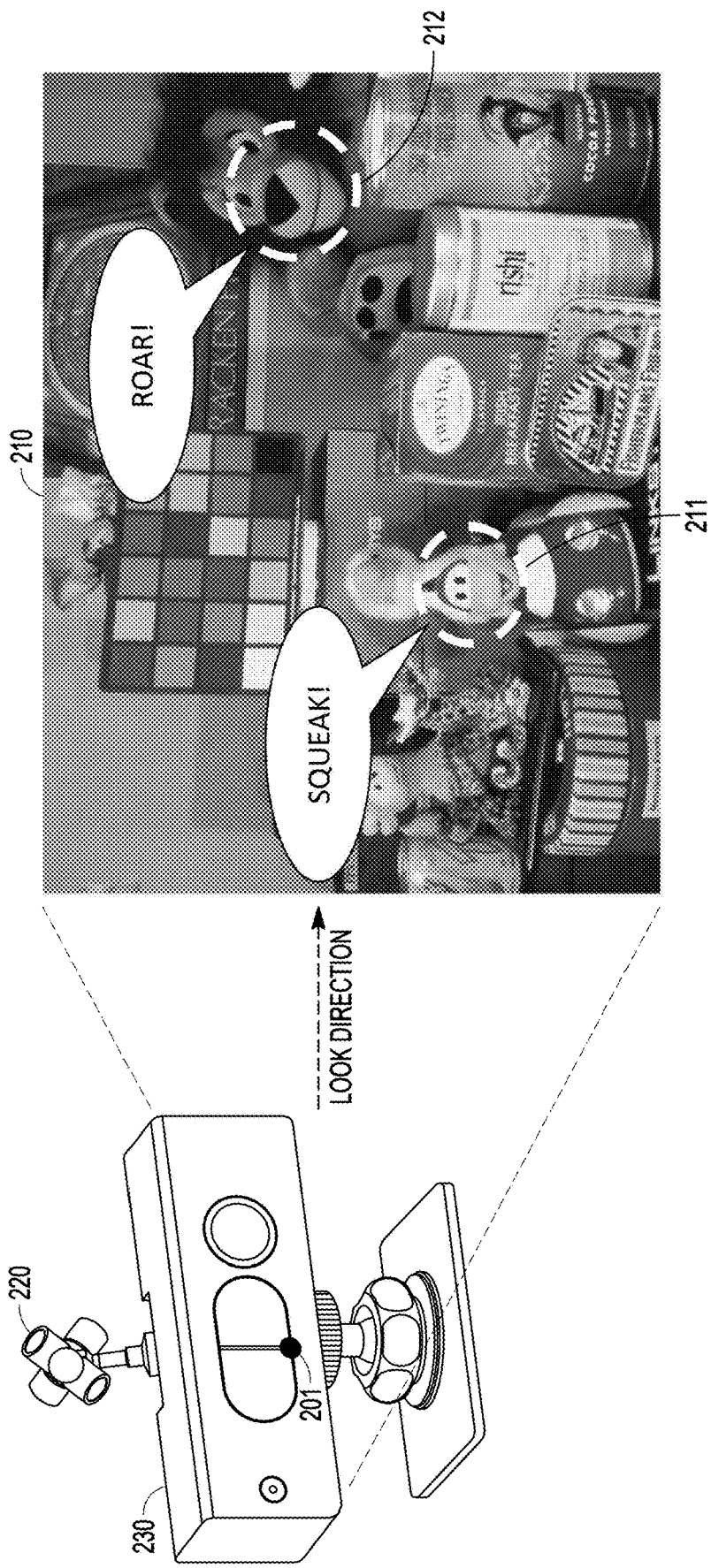
FIG. 2A illustrates generally an example of a system configured to receive audio information and visual information about an environment.
Figure 2B:
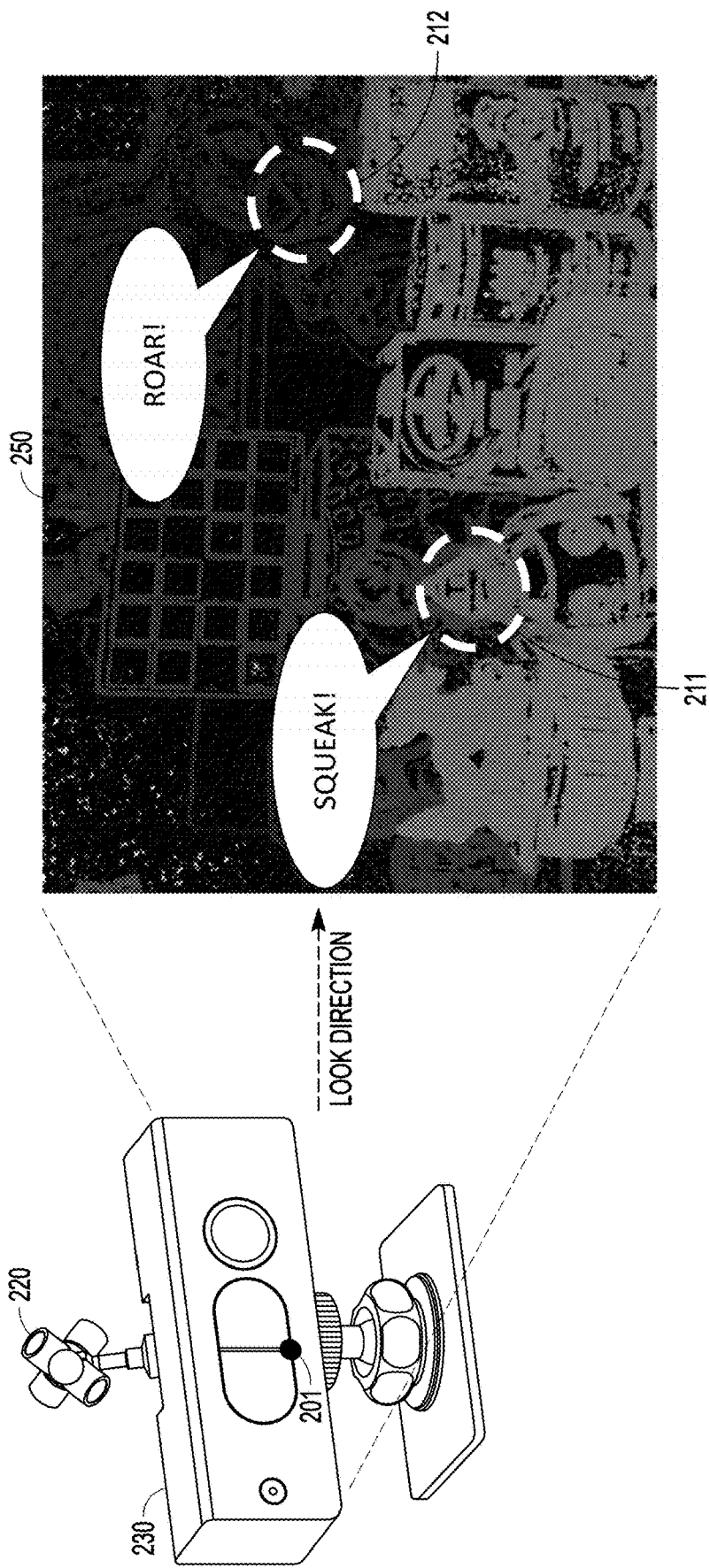
FIG. 2B illustrates generally an example of object identification and depth analysis for the environment.

FIG. 2A illustrates generally an example of a system configured to receive audio information and visual information about an environment. FIG. 2B illustrates generally an example of object identification and depth analysis for the same environment.

The example of FIG. 2A includes a first environment 210 that can include various physical objects and various ones of the physical objects can emit or generate sound. The physical objects can have respective coordinates or locations, such as can be defined relative to an origin of the environment. In the example of FIG. 2A, the origin is designated at a reference position 201, and in the example of FIG. 2A, the reference position 201 coincides with a sensor location.

The example of FIG. 2A includes an audio capture device 220 and a depth sensor 230. Information from the audio capture device 220 and/or the depth sensor 230 can be concurrently received and recorded as an audio-visual program using various recording hardware and software. The audio capture device 220 can include a microphone, or microphone array, that is configured to receive audio information from the first environment 210. In an example, the audio capture device 220 includes a soundfield microphone or ambisonic microphone and is configured to capture audio information in a three-dimensional audio signal format.

The depth sensor 230 can include a camera, such as can have one or multiple lenses or image receivers. In an example, the depth sensor 230 includes a large-field-of-view camera, such as a 360-degree camera. Information received or recorded from the depth sensor 230 as a portion of an audio-visual program can be used to provide a viewer with an immersive or interactive experience, such as can allow the viewer to "look around" the first environment 210, such as when the viewer uses a head-tracking system or other program navigation tool or device.

Audio information, such as can be received from the audio capture device 220 concurrently with video information received from the depth sensor 230 or camera, can be provided to a viewer. Audio signal processing techniques can be applied to audio information received from the audio capture device 220 to ensure that the audio information tracks with changes in the viewer's position or look direction as the viewer navigates the program, such as described in PCT Patent Application Serial No. PCT/US2019/40837, titled "Non-coincident Audio-visual Capture System," which is incorporated herein by reference in its entirety.

The depth sensor 230 can be implemented in various ways or using various devices. In an example, the depth sensor 230 includes a three-dimensional depth sensor configured to capture a depth image of a field of view of the first environment 210 and provide or determine a depth map from the depth image. The depth map can include information about one or more surfaces or object distances. In an example, the depth sensor 230 includes one or more two-dimensional image sensors configured to receive incident light and capture image information about the first environment 210, and the image information can be processed using a processor circuit to identify objects and associated depth information. The depth sensor 230 can include a device that captures depth information about the first environment 210 using, for example, a laser, structured light, time of flight, stereoscopy, or other sensor technology.

In an example, the depth sensor 230 can include a system with a transmitter and a receiver, and can be configured to use active sampling techniques to determine an object depth. For example, the transmitter can emit a signal and use timing information about a bounce-back signal to establish, e.g., a point-cloud representation of an environment. The depth sensor 230 can include or use two or more sensors, such as passive sensors, that can concurrently receive information from an environment and from different perspectives. Parallax in the received data or images can be used to determine depth information about various objects in the environment.

In an example, the depth sensor 230 can be configured to render a data set that can be used for clustering and object identification. For example, if the data indicate a relatively large continuous plane at a common depth, then an object can be identified at the common depth. Other techniques can similarly be used.

In the example of FIG. 2A, the first environment 210 includes various objects at respective various depths relative to the reference position 201. The first environment 210 includes some objects that may generate or produce sound and others that may not. For example, the first environment 210 includes a first object 211, such as a squeaking duck toy, and a second object 212, such as a roaring lion toy. The first environment 210 can include other objects such as a color panel, boxes, canisters, and more.

FIG. 2B illustrates generally a depth map 250 representation of the first environment 210, with the reference position 201, depth sensor 230, and audio capture device 220 included in the example for context. The depth map 250 shows some of the physical objects from the first environment 210 in a lighter color to designate these objects as belonging to a nearer surface or lesser depth relative to the reference position 201. The depth map 250 shows other ones of the physical objects from the first environment 210 in a darker color to designate these other objects as belonging to a farther away surface or greater depth relative to the reference position 201. In the example of FIG. 2B, the first object 211 is identified or determined to be nearer to the reference position 201 than the second object 212, as indicated by their relative false-color (grayscale) representations.

In an example, audio or acoustic information about the first environment 210 can be received using the audio capture device 220. For example, the audio capture device 220 can receive high frequency, short-duration "SQUEAK!" sounds and lower frequency, longer-duration "ROAR!" sounds from the environment. A processor circuit, such as can be coupled to the audio capture device 220 and the depth sensor 230, can receive audio information from the audio capture device 220 and can receive depth map information from the depth sensor 230. The processor circuit, such as comprising the processor circuit 410 from the example of FIG. 4, discussed below, can identify correlations between the audio information and depth information. Based on the identified correlations, the processor circuit can encode a spatial audio signal with information about audio objects at respective different depths, such as using one or more of the systems or methods discussed herein.

Figure 3:
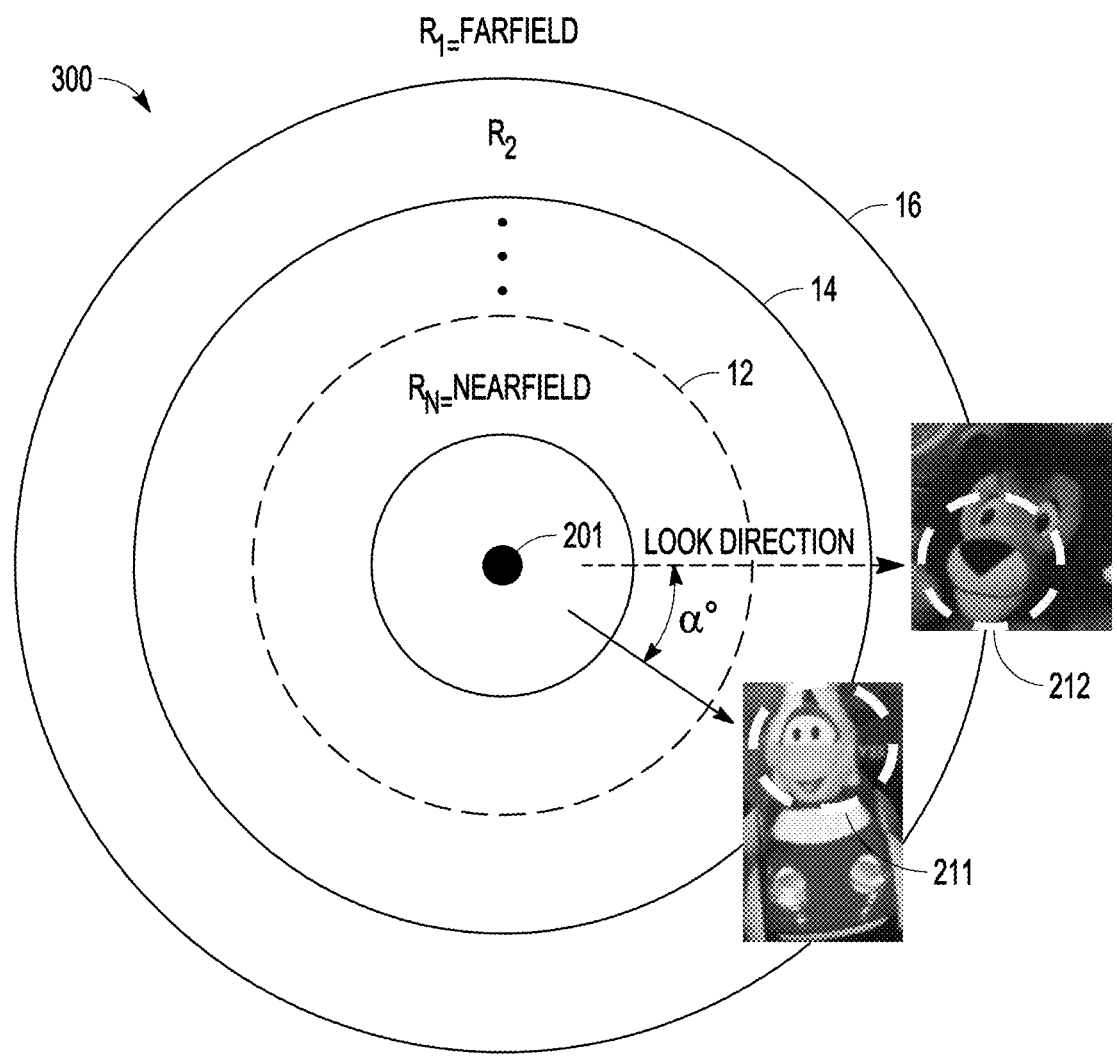
FIG. 3 illustrates generally an example that shows how information from an environment can be quantized to different depths.

FIG. 3 illustrates generally a quantization example 300 that shows how information from the first environment 210 can be quantized to different depths. In the example of FIG. 3, the reference position 201 corresponds to an origin of a soundfield. A Look Direction as indicated in FIG. 3 can correspond to the Look Direction indicated in FIG. 2A or 2B. In the illustrated examples, the Look Direction is to the right of the reference position 201.

The quantization example 300 shows the second object 212 mapped to a location that coincides with a farfield depth or first radius R1 relative to the reference position 201. That is, sounds from the second object 212, such as can be received using the audio capture device 220, can be encoded as farfield signals when the second object 212 is determined to be at a distance R1 from the reference position 201, such as can be determined using a depth map or other information from the depth sensor 230. In an example, the second object 212 can have a location that can be designated by coordinates, such as radial or spherical coordinates, and can include information about a distance and an angle (e.g., including azimuth and/or elevation) from the reference position 201 or from a reference direction, such as the Look Direction. In the example of FIG. 3, the second object 212 can have a location that is defined by the radius R1, an azimuth of 0°, and an elevation of 0° (the example of FIG. 3 does not illustrate the "elevation" plane).

The quantization example 300 shows the first object 211 mapped to an intermediate depth, or radius R2, that is less than the farfield depth or first radius R1 and greater than the nearfield depth or RN. That is, sounds from the first object 211, such as can be received using the audio capture device 220, can be encoded as signals having a particular or specified depth R2, such as when the first object 211 is determined to be at a distance R2 from the reference position 201, such as can be determined using a depth map or other information from the depth sensor 230. In an example, the first object 211 can have a location that can be designated by coordinates, such as radial or spherical coordinates, and can include information about a distance and an angle (e.g., including azimuth and/or elevation) from the reference position 201 or from a reference direction, such as the Look Direction. In the example of FIG. 3, the first object 211 can have a location that is defined by the radius R2, an azimuth of α°, and an elevation of 0° (the example of FIG. 3 does not illustrate the "elevation" plane).

In an example, audio sources, or virtual sources, can be generated and encoded using information from the audio capture device 220 and the depth sensor 230. For example, if the depth sensor 230 indicates an object at a distance (or radius) R2 relative to the reference position 201 and an angle α° relative to the Look Direction, then a first spatial audio signal can be provided and the first spatial audio signal can comprise the audio signal information from the audio capture device 220 (e.g., an audio object or virtual source) positioned at R2 and angle α°. If the depth sensor 230 indicates an object at a distance (or radius) R1 and azimuth angle 0°, then a second spatial audio signal can be provided, and the second spatial audio signal can comprise the audio signal information from the audio capture device 220 positioned at radius R1 and azimuth angle 0°.

In an example, information from the depth sensor 230 can indicate whether one or multiple objects are present in an environment simultaneously. Various techniques can be used to determine which, if any, of the audio information from the audio capture device 220 corresponds to one or more of the respective objects. For example, information about movement of a physical object over time, such as determined using information from the depth sensor 230, can be correlated with changes in the audio information. For example, if a physical object is observed moving from one side of an environment to another and at least a portion of the audio information similarly moves from the same side of the environment to the other, then a correlation can be found between the physical object and the portion of the audio information, and the audio information can be assigned a depth that corresponds to a depth of the moving physical object. In an example, the depth information associated with the audio information can vary over time, such as together with the movement of the physical object. Various threshold conditions or learned parameters can be used to reduce findings of false positive correlations.

In an example, a physical object can be classified using a classifier circuit or software-implemented classifier module. For example, classifier circuit can include a neural network or other recognizer circuit configured to process image information from the depth sensor 230 about an environment, or can process image information from an image capture device that is configured to receive image information about the same environment. In an example, the classifier circuit can be configured to recognize various objects and provide information about respective acoustic profiles associated with such objects. In an example, an acoustic profile can include information about audio frequency, amplitude, or other characteristic of sounds that are known or believed to be associated with a particular object. In the example of FIG. 3, the classifier circuit can be used to recognize the first object 211 as a duck or squeak toy, and in response provide an indication that an acoustic profile of a "SQUEAK" sound (e.g., a sound comprising relatively high frequency information, having a short-duration, and being highly transient) can be generally associated with sounds from the first object 211. Similarly, the classifier circuit can be used to recognize the second object 212 as a lion, and in response provide an indication that an acoustic profile of a "ROAR" sound (e.g., a sound comprising relatively low frequency information, being longer in duration and having a large amplitude and subdued transients) can be generally associated with sounds from the second object 212. In an example, a spatial audio encoder circuit can be coupled to or can include the classifier circuit and can use information about classified objects to identify correlations between input audio information and physical objects in an environment.

Figure 4:
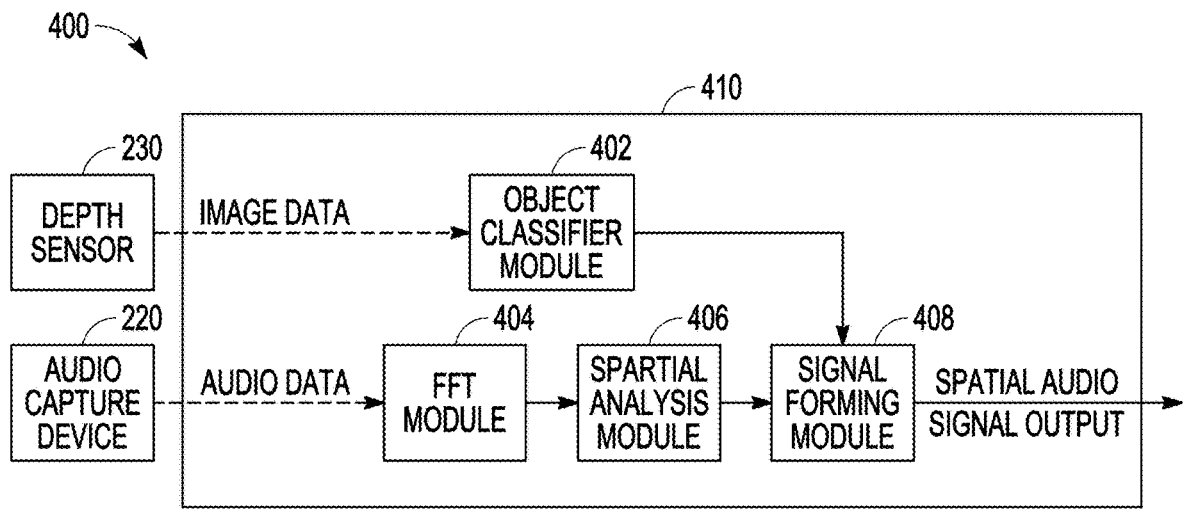
FIG. 4 illustrates generally an example of a block diagram of a system for spatial audio capture and encoding.

FIG. 4 illustrates generally an example of a block diagram of an audio encoder system 400 for audio capture and spatial audio signal encoding. The example of FIG. 4 can include a processor circuit 410, such as can include a spatial audio encoder circuit or module, or an object classifier circuit or module. In an example, circuitry configured according to the block diagram of the audio encoder system 400 can be used to encode or render one or more signals having respective direction or depth characteristics. FIG. 4 represents one example of signal flow and processing, and other interconnections or data sharing between or among the illustrated functional blocks is permissible. Similarly, the processing steps can be redistributed among the modules to accommodate various processor circuit architecture or optimization.

In an example, the audio encoder system 400 can be used to receive an audio signal using the audio capture device 220, receive physical object location or orientation information using a depth sensor 230, and encode a spatial audio signal using the received audio signal and received physical object information. For example, the circuitry can encode a spatial audio signal with information about one or more audio sources, or virtual sources, in a three-dimensional soundfield, such as with each source or group of sources having different respective depth characteristics. In an example, the received audio signal can include a soundfield or 3D audio signal including one or more components or audio objects. The received physical object information can include information about classified objects and associated acoustic profiles or can include information about a placement or orientation of one or more physical objects in an environment.

In an example, spatial audio signal encoding can include using the processor circuit 410, or one or more processing modules thereof, to receive a first audio signal and determine positions, directions, and/or depths for components of the audio signal. Reference frame coordinates or origin information for the audio signal components can be received, measured, or otherwise determined. The one or more audio objects can be decoded for reproduction via loudspeakers or headphones, or can be provided to a processor for re-encoding into a new soundfield format.

In an example, the processor circuit 410 can include various modules or circuits or software-implemented processes (such as can be carried out using a general purpose or purpose-built circuit) for performing audio signal encoding. In FIG. 4, an audio signal or data source can include the audio capture device 220. In an example, the audio source provides audio frame of reference data or origin information to the processor circuit 410. The audio frame of reference data can include information about a fixed or changing origin or reference point for the audio information, such as relative to an environment or relative to the depth sensor 230. The respective origins, reference positions, or orientations of the depth sensor 230 and the audio capture device 220 can change over time and can be considered in determining correlations between physical objects identified in an environment and audio information from the environment.

In an example, the processor circuit 410 includes an FFT module 404 configured to receive audio signal information from the audio capture device 220 and convert the received signal(s) to the frequency domain. The converted signal can be processed using spatial processing, steering, or panning to change a location, depth, or frame of reference for the received audio signal information.

In an example, the processor circuit 410 can include an object classifier module 402. The object classifier module 402 can be configured to implement one or more aspects of the classifier circuit discussed herein. For example, the object classifier module 402 can be configured to receive image or depth information from the depth sensor 230 and apply artificial intelligence-based tools, such as machine learning or neural network-based processing, to identify one or more physical objects that are present in an environment.

In an example, the processor circuit 410 includes a spatial analysis module 406 that is configured to receive the frequency domain audio signals from the FFT module 404 and, optionally, receive at least a portion of the audio data associated with the audio signals. The spatial analysis module 406 can be configured to use a frequency domain signal to determine a relative location of one or more signals or signal components thereof. For example, the spatial analysis module 406 can be configured to determine that a first sound source is or should be positioned in front (e.g., 0° azimuth) of a listener or a reference video location and a second sound source is or should be positioned to the right (e.g., 90° azimuth) of the listener or reference video location. In an example, the spatial analysis module 406 can be configured to process the received signals and generate a virtual source that is positioned or intended to be rendered at a specified location or depth relative to a reference video or image location, including when the virtual source is based on information from one or more input audio signals and each of the spatial audio signals corresponds to a respective different location, such as relative to a reference position.

In an example, the spatial analysis module 406 is configured to determine audio source locations or depths, and use a frame of reference-based analysis to transform the sources to a new location, such as corresponding to a frame of reference for the video source, as similarly discussed in PCT Patent Application Serial No. PCT/US2019/40837, titled "Non-coincident Audio-visual Capture System," which is incorporated herein by reference in its entirety. Spatial analysis and processing of soundfield signals, including ambisonic signals, is discussed at length in U.S. patent application Ser. No. 16/212,387, titled "Ambisonic Depth Extraction," and in U.S. Pat. No. 9,973,874, titled "Audio rendering using 6-DOF tracking," each of which is incorporated herein by reference in its entirety.

In an example, the processor circuit 410 can include a signal forming module 408. The signal forming module 408 can be configured to use a received frequency domain signal to generate one or more virtual sources that can be output as sound objects with associated metadata, or can be encoded as a spatial audio signal. In an example, the signal forming module 408 can use information from the spatial analysis module 406 to identify or place the various sound objects in respective designated locations or at respective depths in a soundfield.

In one example, the signal forming module 408 can be configured to use information from both the spatial analysis module 406 and the object classifier module 402 to identify or place the various sound objects identified by the spatial analysis module 406. In an example, the signal forming module 408 can use information about identified physical objects or audio objects, such as information about an acoustic profile or signature of an identified object, to determine whether the audio data (e.g., received using the audio capture device 220) includes information that corresponds to the acoustic profile. If a sufficient correspondence exists between an acoustic profile for a particular object (e.g., as distinguished from other objects in the environment) and a particular portion of the audio data (e.g., corresponding to a particular frequency band or bands, or duration, or other portion of an audio spectrum over time), then the particular object can be associated with the corresponding particular portion of the audio data. In a further example, such correspondence can be determined using artificial intelligence such as machine learning or neural network-based processing.

In another example, the signal forming module 408 can use results or products of the spatial analysis module 406 with information from the depth sensor 230, optionally processed with the object classifier module 402, to determine audio source locations or depths. For example, the signal forming module 408 can use correlation information or can determine whether a correlation exists between identified physical objects or depths in the image data and audio information received from the spatial analysis module 406. In an example, determining a correlation can be performed at least in part by comparing the directions or positions of the identified visual objects with those of the identified audio objects. Other modules or portions of the processor circuit 410 can similarly or independently be used to determine correlations between information in the image data and information in the audio data.

In examples with high correspondence or correlation, the signal forming module 408 can use a weighted combination of positional information from the audio and visual objects. For example, weights can be used to indicate a relative direction of audio objects that will best match a spatial audio distribution, and can be used together with depth information from the depth sensor visual data or image data. This can provide a final source position encoding that most accurately matches depth capabilities of the spatial audio signal output to the acoustic environment in which the depth sensor and audio capture device are used.

In an example, signals from the signal forming module 408 can be provided to other downstream processing modules that can help generate signals for transmission, reproduction, or other processing. For example, the spatial audio signal output from the signal forming module 408 can include or use virtualization processing, filtering, or other signal processing to shape or modify audio signals or signal components. The downstream processing modules can receive data and/or audio signal inputs from one or more modules and use signal processing to rotate or pan the received audio signals.

In an example, multiple downstream modules create multiple vantage points from which to observe the acoustic environment. Such modules may utilize methods as described in PCT Patent Application Serial No. PCT/US2019/40837, titled "Non-coincident Audio-visual Capture System," which is incorporated herein by reference.

In an alternative example, the audio encoding/rendering portions of signal forming module 408 can be replicated for each desired vantage point. In an example, the spatial audio signal output can include multiple encodings with respective different reference positions or orientations. In an example, the signal forming module 408 can include or can provide signals to an inverse FFT module. The inverse FFT module can generate one or more output audio signal channels with or without metadata. In an example, audio output from the inverse FFT module can be used as an input for a sound reproduction system or other audio processing system. In an example, an output can include a depth-extended ambisonic signal, such as can be decoded by the systems or methods discussed in U.S. Pat. No. 10,231,073, "Ambisonic Audio Rendering with Depth Decoding," which is incorporated herein by reference. In an example, it can be desirable to remain output format agnostic and support decoding to various layout or rendering methods, for example, including mono stems with position information, base/bedmixes, or other soundfield representations such as including ambisonic formats.

In an example, multiple depth sensors can be coupled to the processor circuit 410 and the processor circuit 410 can use information from any one or more of the depth sensors to identify depth information about physical objects in an environment. Each depth sensor can have or can be associated with its own frame of reference or respective reference position in the environment. Accordingly audio objects or sources in the environment can have different relative positions or depths with respect to the reference positions of each depth sensor. As a viewer perspective changes, for example when video information changes from the perspective of a first camera to a perspective of a different second camera, then a listener perspective can similarly change by updating or adjusting a depth or orientation or rotation for the associated audio source or sources. In an example, the processor circuit 410 can be configured to moderate such perspective changes for the audio information, for example, using crossfading or other signal blending techniques.

In an example, multiple audio capture devices (e.g., multiple instances of the audio capture device 220) can be coupled to the processor circuit 410 and the processor circuit 410 can use information from any one or more of the audio capture devices to receive audio information about an environment. In an example, a particular one or combination of audio capture devices can be selected for use based at least in part on a proximity of a particular audio capture device to a particular physical object identified in the environment. That is, if a first audio capture device in an environment is nearer to a first physical object, then audio information from the first audio capture device can be used to generate a depth-encoded audio signal for the first physical object, such as when the first audio capture device better captured sound information about the first physical object than was captured by another audio capture device in the environment.

Figure 5:
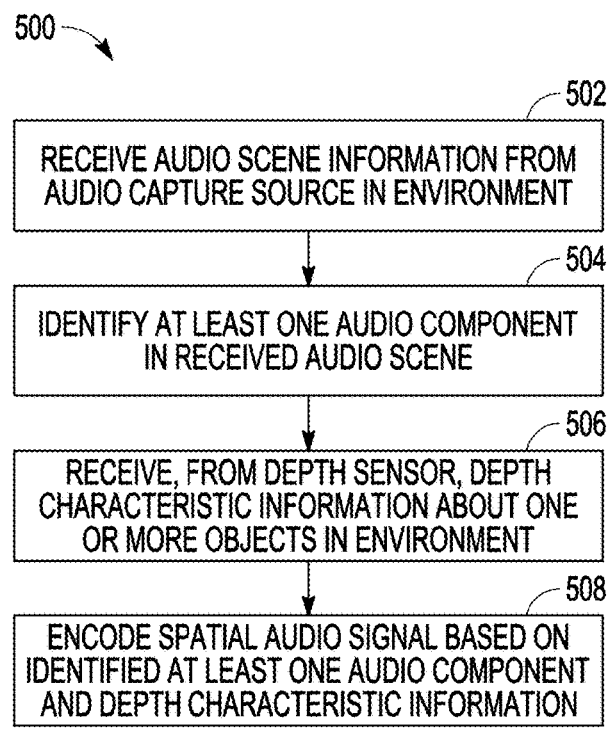
FIG. 5 illustrates generally an example of a first method that can include encoding a spatial audio signal.

FIG. 5 illustrates generally an example of a first method 500 that can include encoding a spatial audio signal. The first method 500 can be performing at least in part using one or more portions of the processor circuit 410. In step 502, the first method 500 can include receiving audio scene information from an audio capture source in an environment. In an example, receiving the audio scene information can include using the audio capture device 220 and the audio scene information can include an audio signal with or without depth information. The audio scene information can optionally have an associated perspective, look direction, orientation, or other spatial characteristic.

In step 504, the first method 500 can include identifying at least one audio component in the received audio scene. Identifying an audio component can include, for example, identifying signal contributions to a time-frequency representation of the received audio scene information. The audio component can include audio signal information for a particular frequency band or range, such as over a duration of an audio program or for a discrete portion of a program. In an example, step 504 can include identifying a direction associated with the audio scene information or associated with a portion of the audio scene information.

In step 506, the first method 500 can include receiving, from a depth sensor, depth characteristic information about one or more objects in the environment. Step 506 can include or use information from the depth sensor 230. In an example, step 506 can include receiving image or depth map information using circuitry in the depth sensor 230 to process the information and identify depth information, or step 506 can include using a different processor circuit coupled to the sensor. In an example, step 506 includes using a processor circuit to identify, in the image or depth map information, one or more physical objects in an environment monitored by the depth sensor 230, such as including identifying boundary information about the objects. In an example, the depth characteristic information can be provided with respect to a reference position for the depth sensor 230 or a reference position for the environment.

In an example, step 506 can include receiving direction information about one or more objects in the environment, such as using information from the depth sensor 230. Step 506 can include identifying respective direction or orientation information for any identified physical objects. The direction or orientation information can be provided relative to a reference position or look direction. In an example, receiving direction information at step 506 can include receiving information about an azimuth angle or altitude angle relative to a reference.

In step 508, the first method 500 can include encoding a spatial audio signal based on the identified at least one audio component and the depth characteristic information. Step 508 can include encoding the spatial audio signal using the received audio scene information from step 502, and using the received depth characteristic from step 506. That is, the spatial audio signal encoded at step 508 can include information such as a virtual source with audio from the received audio scene at step 502 and a depth characteristic from the received depth information at step 506. The encoded spatial audio signal can be, for example, an ambisonic signal that includes audio information quantized at different depths. In an example, step 508 can include encoding the spatial audio signal based on direction information identified in step 504 or received with the depth characteristic at step 506. The encoded spatial audio signal can therefore include information about an azimuth or altitude of a virtual source, such as in addition to a depth of the physical object to which the audio corresponds.

Figure 6:
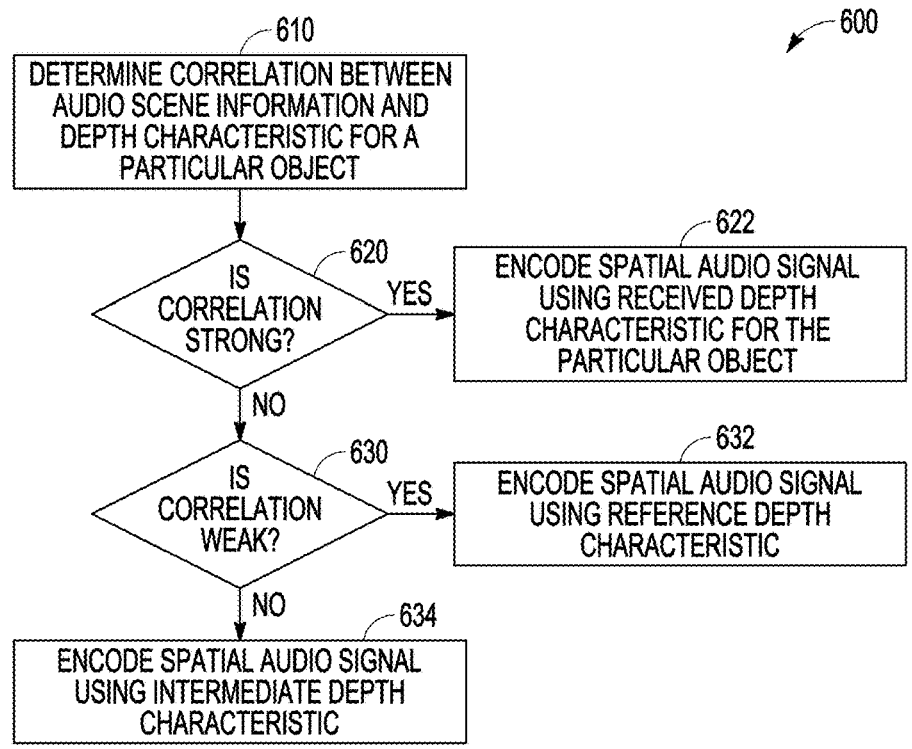
FIG. 6 illustrates generally an example of a second method that can include encoding a spatial audio signal based on correlation information.

FIG. 6 illustrates generally an example of a second method 600 that can include encoding a spatial audio signal based on correlation information. The second method 600 can be performed at least in part using one or more portions of the processor circuit 410. In the example of FIG. 6, step 610 can include determining a correlation between audio scene information from an environment and a depth characteristic for a physical object identified in the environment. In an example, the audio scene information can be received or determined according to the example of the first method 500. Step 610 can include using the processor circuit 410 to analyze audio information and determine a correspondence, or a likelihood of a correspondence, between the audio information and objects, or locations of objects, in the environment.

For example, the processor circuit 410 can identify a changing location of one or more potential audio sources in an environment over time, and the processor circuit 410 can further identify a changing location of one or more physical objects in the environment, such as over the same time. If a location change of at least one of the potential audio sources corresponds to a location change of at least one of the physical objects, then the processor circuit 410 can provide a strong correlation or a positive indication that the audio source and physical object are related.

Various factors or considerations can be used to determine a strength of a correlation or correspondence between identified audio sources and physical objects. For example, information from the object classifier module 402 can be used to provide information about particular audio characteristics that are known to be, or are expected to be, associated with particular identified physical objects. If an audio source with the particular audio characteristics is found in proximity of an identified physical object, then the audio information and physical object can be considered to correspond or correlate. A strength or quality of the correspondence can further be identified or calculated to indicate a confidence that the audio and physical object correlate.

At step 620 and step 630, a strength of the correlation identified at step 610 can be evaluated, such as using the processor circuit 410. At step 620, the second method 600 includes determining if a strong correlation exists between the audio scene information and the depth characteristic for a particular physical object. In an example, whether a correlation is strong can be determined based on a quantitative value of the correlation, such as can be determined at step 610. The quantitative value of the correlation can be compared to various threshold levels, such as can be specified or programmed, or can be learned over time by a machine learning system. In an example, determining a correlation is strong at 620 can include determining a value of the correlation meets or exceeds a specified first threshold value.

In the example of FIG. 6, if the correlation is determined at step 620 to be strong, then the second method 600 can proceed to step 622 and encode a spatial audio signal using a received depth characteristic for the particular object. That is, if a strong correlation is determined at step 620, then the received or identified audio source information can be considered to sufficiently correspond to a particular physical object such that the audio source can be located at the same depth or location as the particular physical object.

If, at step 620, a relative strength of the correlation does not satisfy criteria from step 620, then the second method 600 can proceed to step 630 for further evaluation of the correlation. If a value of the correlation meets or exceeds a specified second threshold condition or value, then the correlation can be determined to be weak, and the second method 600 continues at step 632. Step 632 can include encoding a spatial audio signal using a reference depth characteristic for an audio source. In an example, a reference depth characteristic can include a farfield depth or other default depth. For example, if a sufficient or minimum correlation is not found between a particular audio source or other audio information from an audio scene and an object identified in the environment, or if no specific or discrete object is identified or identifiable, then the audio source can be determined to belong to a farfield or reference plane.

If a value of the correlation at step 630 does not meet the second threshold condition or value, then the second method 600 can continue at step 634. Step 634 can include encoding a spatial audio signal using an intermediate depth characteristic for an audio source. An intermediate depth can be a depth that is nearer to a reference position than it is to a farfield depth, and is a depth that is other than a depth of an identified physical object. In an example, if a correlation determined at step 610 indicates an intermediate certainty or confidence that a particular audio signal corresponds to a particular physical object, then the particular audio signal can be encoded at a location or depth that is near but not necessarily at a depth of the particular physical object.

In an example, the depth information can include a measure of uncertainty that can be considered in determining a correlation. For example, if a depth map indicates an object is likely but uncertain to be at a particular depth, then audio information corresponding to the object can be encoded at a depth other than the particular depth, for example closer to a farfield than the particular depth. In an example, if a depth map indicates an object could be present at a range of different depths, then audio information corresponding to the object can be encoded at a selected one of the depths in the range, such as a furthest depth in the range. Systems and methods for encoding, decoding, and using audio information or mixes with intermediate depth characteristics, such as using differently weighted HRTFs for various depths, is discussed at length in U.S. patent application Ser. No. 16/212,387, titled "Ambisonic Depth Extraction," which is incorporated herein by reference in its entirety.

Figure 7:
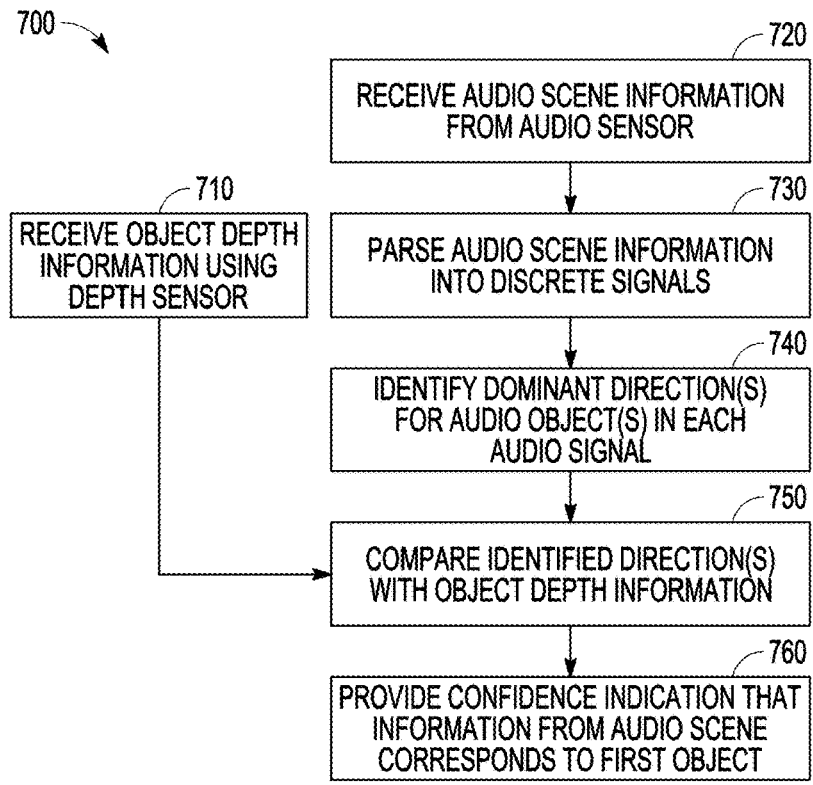
FIG. 7 illustrates generally an example of a third method that can include providing a confidence indication that audio scene information corresponds to a designated object.

FIG. 7 illustrates generally an example of a third method 700 that can include providing a confidence indication that audio scene information corresponds to a designated physical object. The third method 700 can be performed at least in part using one or more portions of the processor circuit 410.

At step 710, the third method 700 can include receiving physical object depth information using the depth sensor 230. In an example, step 710 can include receiving depth information about multiple objects and determining a combined depth estimate for a single object or for a group of multiple objects. In an example, step 710 can include determining a combined depth estimate that can represent a combination of different object depths for candidate objects in the environment. In an example, the depth information can be based on weighted depths or confidence indications about the multiple objects. A confidence indication about an object can indicate a confidence or likelihood that a machine-identified object corresponds to a particular object of interest or to a particular audio object. In an example, a combined depth estimate based on multiple objects can be based on multiple frames of video or from depth information over time, such as to provide a smoothed or continuous indication of depth that slowly transitions rather than quickly jumps to different locations.

At step 720, the third method 700 can include receiving audio scene information from an audio sensor, such as using the audio capture device 220. In the example of FIG. 7, step 730 can include parsing the received audio scene information into discrete audio signals or audio components. In an example, the received audio scene information includes information from a directional microphone, or from a microphone array, or from a soundfield microphone. In an example, the received audio scene information includes a multiple-channel mix of multiple different audio signals, such as can represent audio information from multiple different reference positions, perspectives, look directions, or can have other similar or different characteristics. Step 730 can include generating discrete signals, such as discrete audio signal channels, time-frequency tiles, or other representations of different portions of the audio scene information.

Step 740 can include identifying dominant directions for audio objects in each audio signal. For example, step 740 can include analyzing each of the discrete signals generated at step 730 to identify audio objects therein. An audio object can include, for example, audio information belonging to a particular frequency band, or audio information corresponding to a particular time or duration, or audio information that includes a specified signal characteristic, such as a transience characteristic. Step 740 can include identifying a direction from which each of the audio objects is detected in the audio scene.

Step 750 can include comparing the directions identified at step 740 with the object depth information received at step 710. Comparing the directions can include determining whether a direction, such as relative to a common reference direction or look direction, of an audio object corresponds to a direction of a physical object in the environment. If a correspondence is identified, such as when an audio object and a physical object are both identified or determined to be located at an azimuth angle of 30° relative to a common reference angle, then the third method 700 can include providing a confidence indication that the audio scene (or the particular portion of the audio scene corresponding to the audio object) is correlated with an identified physical object in the environment. The correlation information can be used, for example, to encode the audio scene according to the example of FIG. 6.

FIG. 8 illustrates generally an example of a fourth method 800 that can include determining a correspondence between audio signal characteristics and information received about an audio scene. The fourth method 800 can be performed at least in part using one or more portions of the processor circuit 410. At step 810, the fourth method 800 can include receiving audio scene information from an audio sensor, such as using the audio capture device 220. At step 820, the fourth method 800 can include receiving image or video information, such as from a camera or from the depth sensor 230.

At step 830, the fourth method 800 can include identifying objects in the image or video information received at step 820. Step 830 can include image-based processing, such as using clustering, artificial intelligence-based analysis, or machine learning to identify physical objects that are present, or likely to be present, in an image or field of view of a camera. In an example, step 830 can include determining a depth characteristic for any one or more different objects that are identified.

At step 840, the fourth method 800 can include classifying the objects identified at step 830. In an example, step 840 can include using a neural network-based classifier or machine learning classifier to receive image information and, in response, provide a classification for the identified objects. The classifier can be trained on various data, for example, to recognize humans, animals, inanimate objects, or other objects that may or may not produce sounds. Step 850 can include determining audio characteristics associated with a classified object. For example, if a human male is identified at step 840, then step 850 can include determining an acoustic profile that corresponds to a human male voice, such as can have various frequency and transience characteristics. If a lion is identified at step 840, then step 850 can include determining an acoustic profile that corresponds to noises or utterances that are known to be associated with a lion, such as can have different frequency and transience characteristics than those associated with a human. In an example, step 850 can include or use a lookup table to map audio characteristics with various objects or object types.

At step 860, the fourth method 800 can include determining a correspondence between the audio characteristics determined at step 850 and the audio scene information received at step 810. For example, step 860 can include determining whether the audio scene information includes audio signal content that matches or corresponds to an acoustic profile of an object identified in the environment. In an example, information about the correspondence can be used to determine a correlation between the audio scene and a detected physical object, such as can be used according to the example of FIG. 6.

The various illustrative logical blocks, modules, methods, and algorithm processes and sequences described in connection with the embodiments disclosed herein can be implemented as electronic hardware, computer software, or combinations of both. To clearly illustrate this interchangeability of hardware and software, various illustrative components, blocks, modules, and process actions have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of this document. Embodiments of the systems and methods for detect depth information and encoding spatial audio signals using correlations between depths and audio information, among other techniques described herein, are operational within numerous types of general purpose or special purpose computing system environments or configurations, such as described in the discussion of FIG. 9.

The various illustrative logical blocks and modules described in connection with the embodiments disclosed herein can be implemented or performed by a machine, such as a general purpose processor, a processing device, a computing device having one or more processing devices, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor and processing device can be a microprocessor, but in the alternative, the processor can be a controller, microcontroller, or state machine, combinations of the same, or the like. A processor can also be implemented as a combination of computing devices, such as a combination of a DSP and a microprocessor, a plurality of microprocessors, one or more microprocessors in conjunction with a DSP core, or any other such configuration.

Further, one or any combination of software, programs, or computer program products that embody some or all of the various examples of the virtualization and/or sweet spot adaptation described herein, or portions thereof, may be stored, received, transmitted, or read from any desired combination of computer or machine-readable media or storage devices and communication media in the form of computer executable instructions or other data structures. Although the present subject matter is described in language specific to structural features and methodological acts, it is to be understood that the subject matter defined in the appended claims is not necessarily limited to the specific features or acts described herein. Rather, the specific features and acts described above are disclosed as example forms of implementing the claims.

Various systems and machines can be configured to perform or carry out one or more of the signal processing tasks described herein, including but not limited to audio component positioning or re-positioning, or orientation determination or estimation, such as using HRTFs and/or other audio signal processing. Any one or more of the disclosed circuits or processing tasks can be implemented or performed using a general-purpose machine or using a special, purpose-built machine that performs the various processing tasks, such as using instructions retrieved from a tangible, non-transitory, processor-readable medium.

Figure 9:
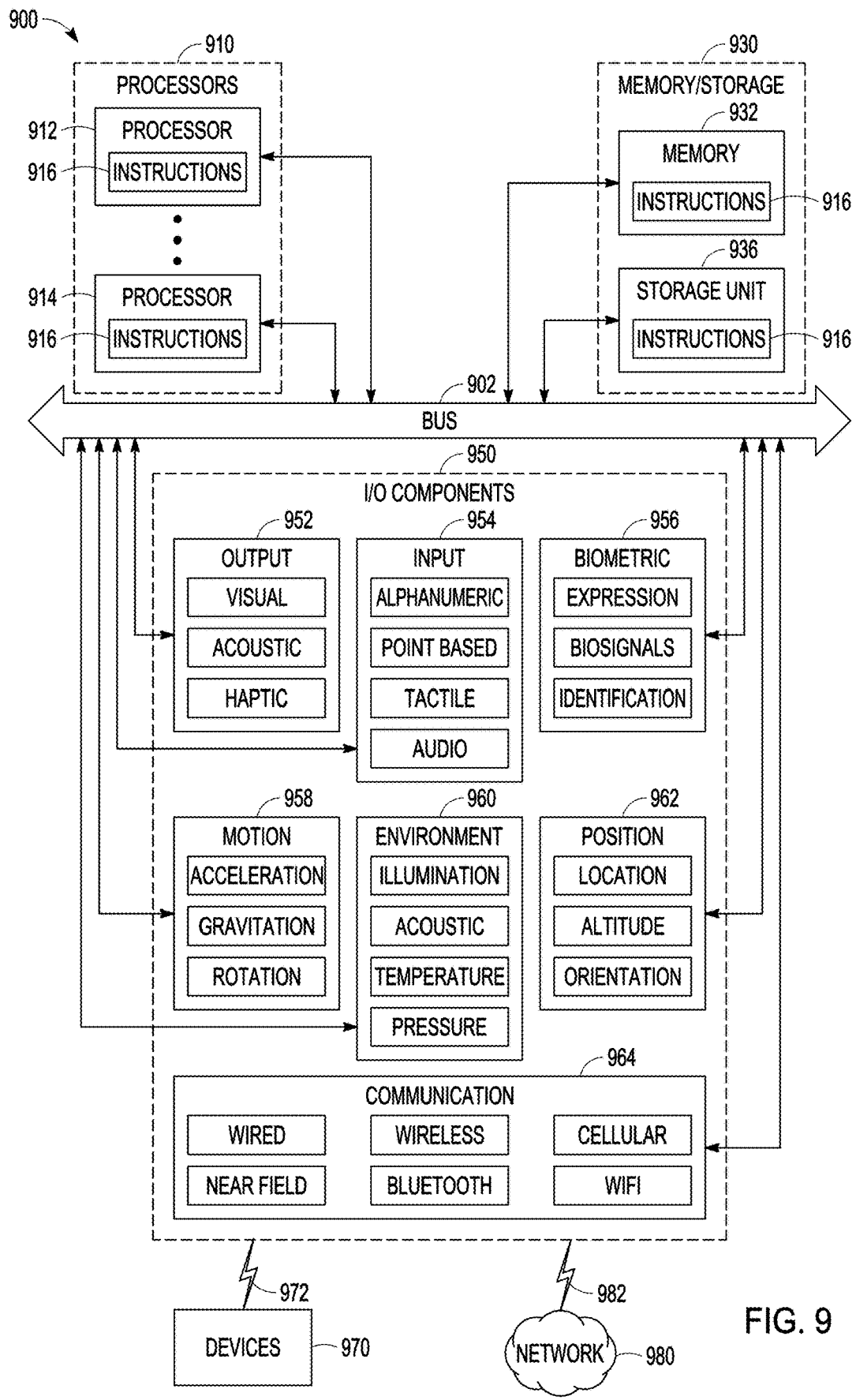
FIG. 9 illustrates generally a diagram of a machine in the form of a computer system within which a set of instructions may be executed for causing the machine to perform any one or more of the methods discussed herein.

FIG. 9 is a diagrammatic representation of a machine 900 within which instructions 908 (e.g., software, a program, an application, an applet, an app, or other executable code) for causing the machine 900 to perform any one or more of the methodologies discussed herein can be executed. For example, the instructions 908 can cause the machine 900 to execute any one or more of the methods described herein. The instructions 908 can transform the general, non-programmed machine 900 into a particular machine 900 programmed to carry out the described and illustrated functions in the manner described.

In an example, the machine 900 can operate as a standalone device or can be coupled (e.g., networked) to other machines or devices or processors. In a networked deployment, the machine 900 can operate in the capacity of a server machine or a client machine in a server-client network environment, or as a peer machine in a peer-to-peer (or distributed) network environment. The machine 900 can comprise a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" can be taken to include a collection of machines that individually or jointly execute the instructions 908 to perform any one or more of the methodologies discussed herein. In an example, the instructions 908 can include instructions that can be performed using the processor circuit 410 to carry out one or more of the methods discussed herein.

The machine 900 can include various processors and processor circuitry, such as represented in the example of FIG. 9 as processors 902, memory 904, and I/O components 942, which can be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 906 and a processor 910 that execute the instructions 908. The term "processor" is intended to include multi-core processors that can comprise two or more independent processors (sometimes referred to as "cores") that can execute instructions contemporaneously. Although FIG. 9 shows multiple processors, the machine 900 can include a single processor with a single core, a single processor with multiple cores (e.g., a multi-core processor), multiple processors with a single core, multiple processors with multiples cores, or any combination thereof, for example to provide the processor circuit 410.

The memory 904 can include a main memory 912, a static memory 914, or a storage unit 916, such as can be accessible to the processors 902 via the bus 944. The memory 904, the static memory 914, and storage unit 916 can store the instructions 908 embodying any one or more of the methods or functions or processes described herein. The instructions 908 can also reside, completely or partially, within the main memory 912, within the static memory 914, within the machine-readable medium 918 within the storage unit 916, within at least one of the processors (e.g., within a processor's cache memory), or any suitable combination thereof, during execution thereof by the machine 900.

The I/O components 942 can include a wide variety of components to receive input, provide output, produce output, transmit information, exchange information, capture measurements, and so on. The specific I/O components 942 that are included in a particular machine will depend on the type of machine. For example, portable machines such as mobile phones can include a touch input device or other such input mechanisms, while a headless server machine will likely not include such a touch input device. It will be appreciated that the I/O components 942 can include many other components that are not shown in FIG. 9. In various example embodiments, the I/O components 942 can include output components 928 and input components 930. The output components 928 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), video input components, and the like.

In an example, the I/O components 942 can include biometric components 932, motion components 934, environmental components 936, or position components 938, among a wide array of other components. For example, the biometric components 932 include components configured to detect a presence or absence of humans, pets, or other individuals or objects, or configured to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 can include acceleration sensor components (e.g., accelerometer), gravitation sensor components, rotation sensor components (e.g., gyroscope), and so forth.

The environmental components 936 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment. The position components 938 include location sensor components (e.g., a GPS receiver component, an RFID tag, etc.), altitude sensor components (e.g., altimeters or barometers that detect air pressure from which altitude can be derived), orientation sensor components (e.g., magnetometers), and the like.

The I/O components 942 can include communication components 940 operable to couple the machine 900 to a network 920 or or devices 922 via a coupling 924 and a coupling 926, respectively. For example, the communication components 940 can include a network interface component or another suitable device to interface with the network 920. In further examples, the communication components 940 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 can be another machine or any of a wide variety of peripheral devices (e.g., a peripheral device coupled via a USB).

Moreover, the communication components 940 can detect identifiers or include components operable to detect identifiers. For example, the communication components 940 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 940, such as location via Internet Protocol (IP) geolocation, location via Wi-Fi® signal triangulation, or location via detecting an NFC beacon signal that can indicate a particular location, and so forth.

The various memories (e.g., memory 904, main memory 912, static memory 914, and/or memory of the processors 902) and/or storage unit 916 can store one or more instructions or data structures (e.g., software) embodying or used by any one or more of the methodologies or functions described herein. These instructions (e.g., the instructions 908), when executed by processors or processor circuitry, cause various operations to implement the embodiments discussed herein.

The instructions 908 can be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 can be transmitted or received using a transmission medium via the coupling 926 (e.g., a peer-to-peer coupling) to the devices 922.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made. As will be recognized, certain embodiments of the inventions described herein can be embodied within a form that does not provide all of the features and benefits set forth herein, as some features can be used or practiced separately from others.

Moreover, although the subject matter has been described in language specific to structural features or methods or acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
   receiving audio scene information from an audio capture source in an environment;
   parsing the audio scene information into one or more audio components;
   identifying dominant directions for a first physical object and a second physical object in each audio component;
   receiving, from a depth sensor, depth characteristic information about the first physical object and the second physical object in the environment;
   associating the depth characteristic information with the dominant directions; and
   providing a confidence indication that the audio scene information corresponds to at least one of the first physical object or the second physical object.

2. The method of claim 1, wherein the at least one of the one or more audio components is determined using information about signal contributions to a time-frequency representation of the received audio scene information.

3. The method of claim 1, further comprising determining a first direction and a reference depth, relative to the audio capture source, for the at least one of the one or more audio components.

4. The method of claim 3, wherein the depth characteristic information includes a measure of a confidence used to determine a correlation between the at least one of the one or more audio components and at least one of the first physical object and second physical object.

5. The method of claim 4, further comprising providing a first depth for the at least one of the one or more audio components using the measured confidence.

6. The method of claim 5, wherein providing the first depth includes:
when the confidence is high, providing the first depth based on information from the depth sensor;
when the confidence is low, providing the first depth as the reference depth; and
when the confidence is intermediate, providing the first depth as a depth that is between the reference depth and a depth determined using the depth sensor.

7. The method of claim 4, wherein the confidence is determined based on a computer vision processor to classify objects identified in the environment and to determine whether the at least one of the one or more audio components includes, or is likely to include, audio from at least one of the first physical object or the second physical object.

8. The method of claim 4, wherein the confidence is determined based on
identifying one or more data clusters in the depth characteristic information from the depth sensor, and
correlating the first direction of the at least one of the one or more audio components to the identified one or more data clusters.

9. The method of claim 1, further comprising encoding a depth-extended ambisonic signal based on the audio scene information and the depth characteristic information for the at least one of the first physical object or the second physical object.

10. The method of claim 1, further comprising:
determining a classification of the first physical object using an image-based object classifier.

11. A system comprising:
an audio capture source configured to capture an audio scene in an environment;
a depth sensor configured to provide depth characteristic information about multiple objects in the environment relative to a reference location of the depth sensor; and
a processor circuit configured to:
receive audio scene information from an audio capture source in an environment;
parse the audio scene information into one or more audio components;
identify dominant directions for a first physical object and a second physical object in each audio component;
receive, from the depth sensor, depth characteristic information about the first physical object and the second physical object in the environment;
associating the depth characteristic information with the dominant directions; and
providing a confidence indication that the audio scene information corresponds to at least one of the first physical object or the second physical object.

12. The system of claim 11, wherein the audio capture source comprises one or more of a multiple-transducer microphone, a sound field microphone, a microphone array, and an ambisonic microphone, and wherein the depth sensor comprises one or more of a laser, a modulated light source, a stereoscopic camera, a depth probe, an infrared sensor, and a camera array.

13. The system of claim 11, wherein the processor circuit is configured to encode a spatial audio signal as a depth-extended ambisonic signal based on the audio scene and the depth characteristic information about the first physical object.

14. The system of claim 13, wherein the processor circuit is configured to use a weighted combination of depth information about the multiple objects to encode the spatial audio signal.

15. The system of claim 14, wherein the processor circuit is configured to determine a confidence that information from the audio scene corresponds to the first physical object from among the multiple objects in the environment, and wherein the processor circuit is configured to encode the spatial audio signal based on the determined confidence meeting or exceeding a specified confidence threshold.

16. The system of claim 15, further comprising an object classifier circuit configured to determine a classification for the first physical object and the second physical object; and
wherein the processor circuit is configured to determine a correspondence between the classification of the first physical object or the second physical object and at least one audio component of the one or more audio components, and wherein the processor circuit is configured to encode the spatial audio signal based on a value of the determined correspondence in response to the determined correspondence meeting a threshold correspondence condition.

17. An audio signal encoder device comprising:
a processor and a non-transitory computer-readable medium operably coupled thereto, the non-transitory computer-readable medium comprising instructions stored in associated therewith that are accessible to, and executable by, the processor, wherein the instructions comprise:
instructions that, when executed, receive audio scene information from an audio capture source in an environment
instructions that, when executed, parse the audio scene information into one or more audio components;
instructions that, when executed identify dominant directions for a first physical object and a second physical object in each audio component;
instructions that, when executed, receive, from a depth sensor, depth characteristic information about the first physical object and the second physical object in the environment;
instructions that, when executed, associate the depth characteristic information with the dominant directions; and
instructions that, when executed, provide a confidence indication that the audio scene information corresponds to at least one of the first physical object or the second physical object.

18. The audio signal encoder device of claim 17, further comprising instructions that, when executed, conditionally encode a spatial audio signal, including instructions that, when executed:

encode the spatial audio signal based on depth information about the first physical object in the environment when the audio characteristic corresponds to a first audio component identified in the audio scene information; and encode the spatial audio signal based on a reference depth when the audio characteristic does not correspond to the first audio component identified in the audio scene, wherein the reference depth is a characteristic of the audio capture source and/or of the environment.

19. The audio signal encoder device of claim 18, further comprising instructions that, when executed, encode the spatial audio signal using the first audio component and using depth information about the first physical object in the environment.

20. The audio signal encoder device of claim 18, further comprising instructions that, when executed, determine a classification of the first physical object using an image-based object classifier.

\* \* \* \* \*